US011981046B2

(12) United States Patent
Wallace

(10) Patent No.: US 11,981,046 B2
(45) Date of Patent: May 14, 2024

(54) APPARATUS FOR FACILITATING CROSSCUTTING WOOD LOGS ON SAWMILL BEDS

(71) Applicant: WOOD-MIZER INTELLECTUAL PROPERTY, LLC, Indianapolis, IN (US)

(72) Inventor: Stephanie N Wallace, Plainfield, IN (US)

(73) Assignee: WOOD-MIZER INTELLECTUAL PROPERTY, LLC, Indianapolis, IN (US)

( * ) Notice: Subject to any disclaimer, the term of this patent is extended or adjusted under 35 U.S.C. 154(b) by 127 days.

(21) Appl. No.: 17/690,416

(22) Filed: Mar. 9, 2022

(65) Prior Publication Data

US 2022/0288805 A1 Sep. 15, 2022

Related U.S. Application Data

(60) Provisional application No. 63/158,394, filed on Mar. 9, 2021.

(51) Int. Cl.
*B27B 29/02* (2006.01)
*B27B 13/02* (2006.01)

(52) U.S. Cl.
CPC .............. *B27B 29/02* (2013.01); *B27B 13/02* (2013.01)

(58) Field of Classification Search
CPC ................................ B27B 29/02; B27B 13/02
USPC ............................................................ 83/465
See application file for complete search history.

(56) References Cited

U.S. PATENT DOCUMENTS 707,641 A * 8/1902 Rostochil ................. B26D 7/01 83/465
1,488,073 A * 3/1924 Smith ..................... B27B 21/00 83/458
1,492,721 A * 5/1924 Barrett ..................... A01G 3/08 83/745
2,616,160 A * 11/1952 Noll ..................... B23D 55/046 83/414
3,895,551 A * 7/1975 Goransson ............ B28B 11/145 83/651.1
4,020,540 A * 5/1977 Casciotti ................ H01R 43/01 29/749
4,187,751 A * 2/1980 Barnacle ............ H05K 13/0473 83/458
4,432,449 A * 2/1984 Neff .......................... B27B 5/18 83/437.1
5,941,152 A * 8/1999 Kim .......................... B25B 5/10 29/283

(Continued)

*Primary Examiner* — Omar Flores Sanchez

(74) *Attorney, Agent, or Firm* — Maginot, Moore & Beck LLP

(57) ABSTRACT

An apparatus for mounting logs for processing on a sawmill having a log bed defining a log bed plane includes a first plate, a stationary jaw, and movable jaw. The first plate is configured to be fixedly mountable on a log bed of a sawmill, and configured to support a log to be cross-cut. The stationary jaw is fixedly supported on the plate. The movable jaw is supported on the plate, and is configured to move at least in part in a direction parallel to the log bed plane when the first plate is mounted on the log bed. The movable jaw and the stationary jaw are collectively configured to fixedly clamp a log on the first plate in a clamp interior such that a grain direction of the log is normal to the log bed plane.

7 Claims, 5 Drawing Sheets

(56) References Cited

U.S. PATENT DOCUMENTS

| | | | | |
|---|---|---|---|---|
| 6,196,283 | B1 * | 3/2001 | Hundegger | B23D 47/045 409/215 |
| 6,279,441 | B1 * | 8/2001 | Streblow | B27B 31/08 83/508.3 |
| 7,249,548 | B2 * | 7/2007 | Blanco | B23D 47/005 83/458 |
| 7,536,941 | B2 * | 5/2009 | Chou | B26D 1/09 83/563 |
| 7,950,316 | B2 * | 5/2011 | Koskovich | B27B 31/06 83/454 |
| 11,267,158 | B1 * | 3/2022 | Kilgore | B27C 7/00 |
| 2002/0078811 | A1 * | 6/2002 | Moss | B26D 7/0633 83/466 |
| 2009/0056516 | A1 * | 3/2009 | Gramiak | B23D 47/04 83/462 |
| 2010/0077897 | A1 * | 4/2010 | Gurley | B28D 5/024 83/451 |
| 2014/0015184 | A1 * | 1/2014 | Dale | B27B 29/08 269/56 |
| 2014/0174603 | A1 * | 6/2014 | Dale | B27B 29/02 144/306 |
| 2015/0114195 | A1 * | 4/2015 | Kimura | B23D 45/042 83/466 |
| 2018/0200914 | A1 * | 7/2018 | Hundegger | B27B 29/02 |
| 2021/0101305 | A1 * | 4/2021 | Benner | B27B 15/02 |
| 2023/0036267 | A1 * | 2/2023 | Bramley | B27B 13/02 |
| 2023/0083194 | A1 * | 3/2023 | Schie | B23D 55/02 30/166.3 |

* cited by examiner

APPARATUS FOR FACILITATING CROSSCUTTING WOOD LOGS ON SAWMILL BEDS

The present application claims the benefit of U.S. Provisional Patent Application Ser. No. 63/158,394, filed Mar. 9, 2021, the entirety of which is in incorporated herein by reference.

BACKGROUND

Portable sawmills currently provide a means of safely and securely clamping wooden logs so that the bandsaw blade may cut and process wood parallel to the grain. This type of cut is defined as a rip-cut, and can be used to produce elongate wooden planks or boards. A rip-cut is the fundamental type of cut made by a sawmill.

There exists a desire to cut and process wood perpendicular to the grain of a wooden log on a portable sawmill. This type of cut is defined as a cross-cut. Cross-cut segments from logs, known colloquially as "cookie(s)", are popular in-home decor, and fine furniture fabrication. Currently, there are no means or provisions on the market that allow for a wooden log to be safely and securely clamped to portable sawmills to allow for cross-cutting.

SUMMARY

At least some embodiments described herein comprise an apparatus that may be secured to a portable sawmill's bed. This apparatus safely and securely clamps segmented logs in a vertical position, allowing for a cross-cut to be performed by the saw of the portable sawmill.

In a first embodiment, an apparatus for mounting logs for processing on a sawmill having a log bed defining a log bed plane includes a first plate, a stationary jaw, and movable jaw. The first plate is configured to be fixedly mountable on a log bed of a sawmill, and configured to support a log to be cross-cut. The stationary jaw is fixedly supported on the plate. The movable jaw is supported on the plate, and is configured to move at least in part in a direction parallel to the log bed plane when the first plate is mounted on the log bed. The movable jaw and the stationary jaw are collectively configured to fixedly clamp a log on the first plate in a clamp interior such that a grain direction of the log is normal to the log bed plane.

In a second embodiment an apparatus for mounting logs for processing on a sawmill having a log bed defining a log bed plane includes a first plate, a stationary jaw, a movable jaw, and at least a first lead screw. The first plate is configured to be fixedly mountable on a log bed of a sawmill, and configured to support a log to be cross-cut. The stationary jaw is fixedly supported on the plate. The movable jaw is supported on the plate, and is configured to move at least in part in a direction parallel to the log bed plane when the first plate is mounted on the log bed. The movable jaw and the stationary jaw are collectively configured to fixedly clamp a log on the first plate in a clamp interior such that a grain direction of the log is normal to the log bed plane. The first lead screw is operably coupled to cause movement of the at least one movable jaw in the direction parallel to the log bed plane.

In one exemplary embodiment, the apparatus holds round vertical logs above the bottom cutting plate of a sawmill bed utilizing two grooved (or toothed) jaws that provide multiple points of contact with the log. These multiple contact points create a safe and secure hold on the log. The movable jaw allows the apparatus to secure logs of varying diameters.

In another embodiment, the apparatus includes a main platform configured to span at least partly between bed rails of a portable sawmill, and an adjustable clamping mechanism or other means for securing the log to the platform. Ideally, the log shall be secured with multiple points of contact. In some embodiments, the clamping mechanism includes a set of jaws with grooves ideally resembling a v-shape. The addition of a series of sharp teeth to these grooves may increase the stability of the log during operation. One or more of these jaws may be movable to allow for a variety of sized logs to be placed on the main platform.

At least another embodiment is an apparatus for cross-cutting logs that includes a sawmill bed, a saw head including a saw, and a positioning apparatus that clamps logs in a vertical position on the saw mill bed such that the saw can perform a cross-cut on the logs.

The above-described features and advantages, as well as others, will become more readily apparent to those of ordinary skill in the art by reference the following detailed description and accompanying drawings.

DETAIL DESCRIPTION

Figure 1:
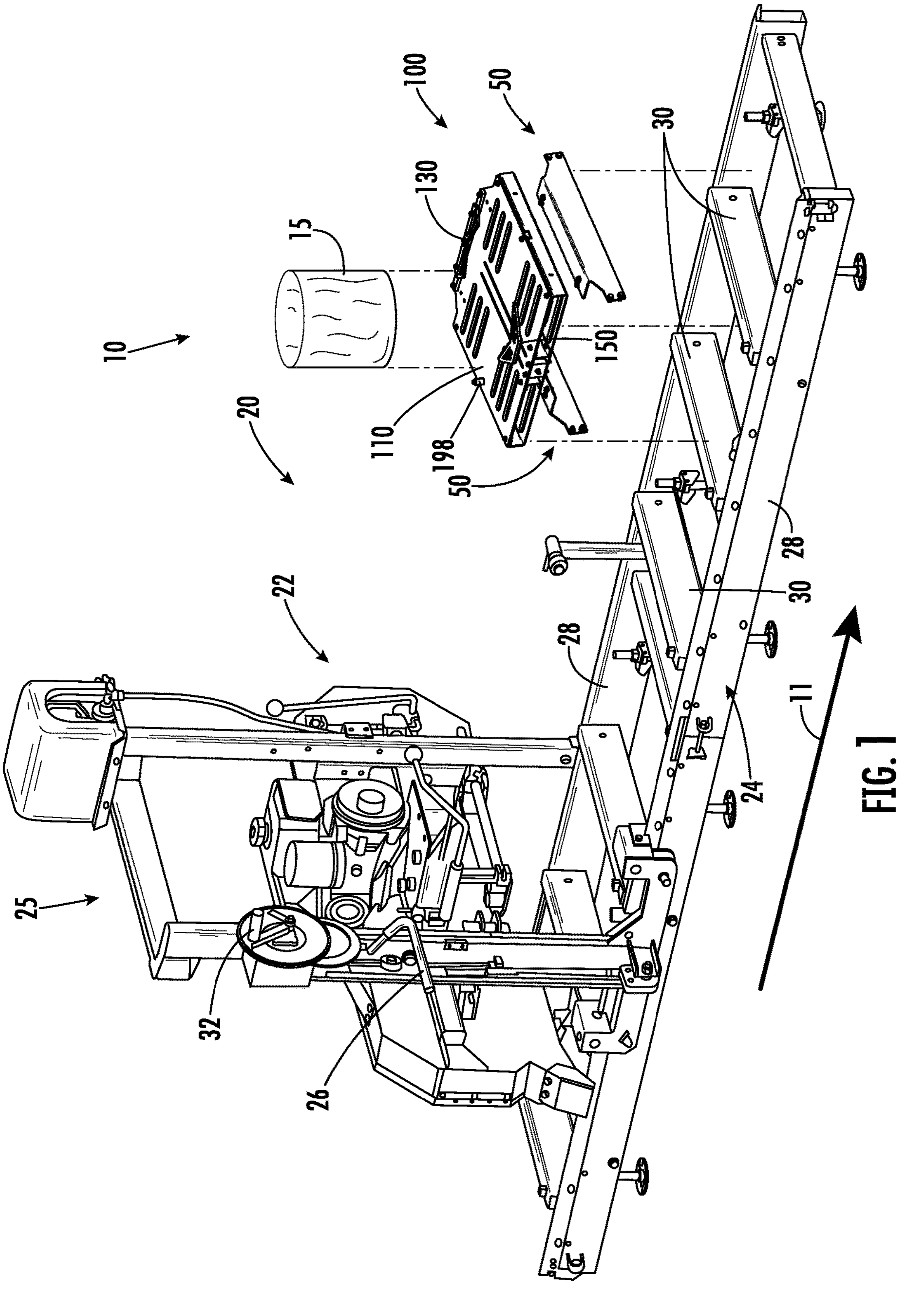
FIG. 1 shows a partially exploded view of an exemplary system for cross-cutting rounded logs.

FIG. 1 shows a partially exploded view of an exemplary system 10 for cross-cutting rounded logs that includes a sawmill 20, mounting brackets 50, and a mounting apparatus 100 according to a first embodiment. The mounting apparatus 100 is configured to mount to the sawmill 20 via the mounting brackets 50. As will be discussed below in detail, the mounting apparatus 100 is further configured to secure a log 15, such that the sawmill 20 can perform a cross-cut of the log 15 produce what is known as a cookie.

The sawmill 20 may in this embodiment includes a saw head 22, a log bed 24, a saw head carriage 25, and a push handle 26. The log bed 24 includes a set of elongate log rails 28 and cross-bunks 30. In this embodiment, the set of log rails 28 includes two parallel metal rails, and the cross-bunks 30 are plates or short rails that extend perpendicularly between the log rails 28. The tops of the cross bunks 30 generally define a log bed plane that maybe substantially parallel to the ground. The cross bunks 30 and log rails 28 are configured to support a log to be cut on the log bed plane.

In general, the saw head 22 is mounted on the saw head carriage 25, and includes a saw blade, not shown. The saw head carriage 25 is movably mounted on the log rails 28 such that the saw head carriage 25 and saw head is capable of moving linearly in a direction parallel to the log bed plane. This direction is referred to as the cut direction 11. The push handle 26 is secured to the saw head carriage 25 and provides a mechanism by which a user may cause the linear movement of the saw head carriage 25 and saw head 22 in the cut direction 11 (and the reverse). The saw head carriage 25 may also include an up/down crank system 32 configured to adjust the vertical position of the saw head 22, thereby adjusting the height of the cut as is known in the art.

It will be appreciated that the sawmill 20 of FIG. 1 is given by way of illustrative example, and that the mounting apparatus 100 may readily be adapted to be mounted on the log bed of other types of sawmills, including but not limited to those driven by means other than the push handle 26, and those without parallel log rails.

Referring again to the example of FIG. 1, the mounting apparatus 100 includes a first plate 110, a stationary jaw 130, and movable jaw 150. The first plate 110 is fixedly mountable on the log bed 24 of the sawmill 20, either directly or indirectly via the mounting brackets 50. The first plate 110 is otherwise configured to support a log to be cross-cut, such as the log 15, and thus is structurally capable of supporting substantial weight. It will be appreciated that the log 15 to be cross-cut is mounted more or less upright on the first plate 110, nominally in the same direction as the trunk of a standing tree. The log 15 is secured on the first plate 110 for cross-cut by the stationary jaw 130 and the movable jaw 150.

Specifically, the stationary jaw 130 is supported on the first plate 110, and the moveable jaw 150 is movably supported on the first plate 110. The movable jaw 150 is configured to move at least in part in a direction parallel to the log bed plane when the first plate 110 is mounted on the log bed 24. The movable jaw 150 and the stationary jaw 130 are collectively configured to fixedly clamp a log on the first plate 110 in a clamp interior 104 such that a grain direction of the log is normal to the log bed plane and cut direction 11. The movable jaw 150 can be adjusted to a position in which the stationary jaw 130 and the movable jaw 150 tightly engage the round log 15 from opposite sides.

Figure 2:
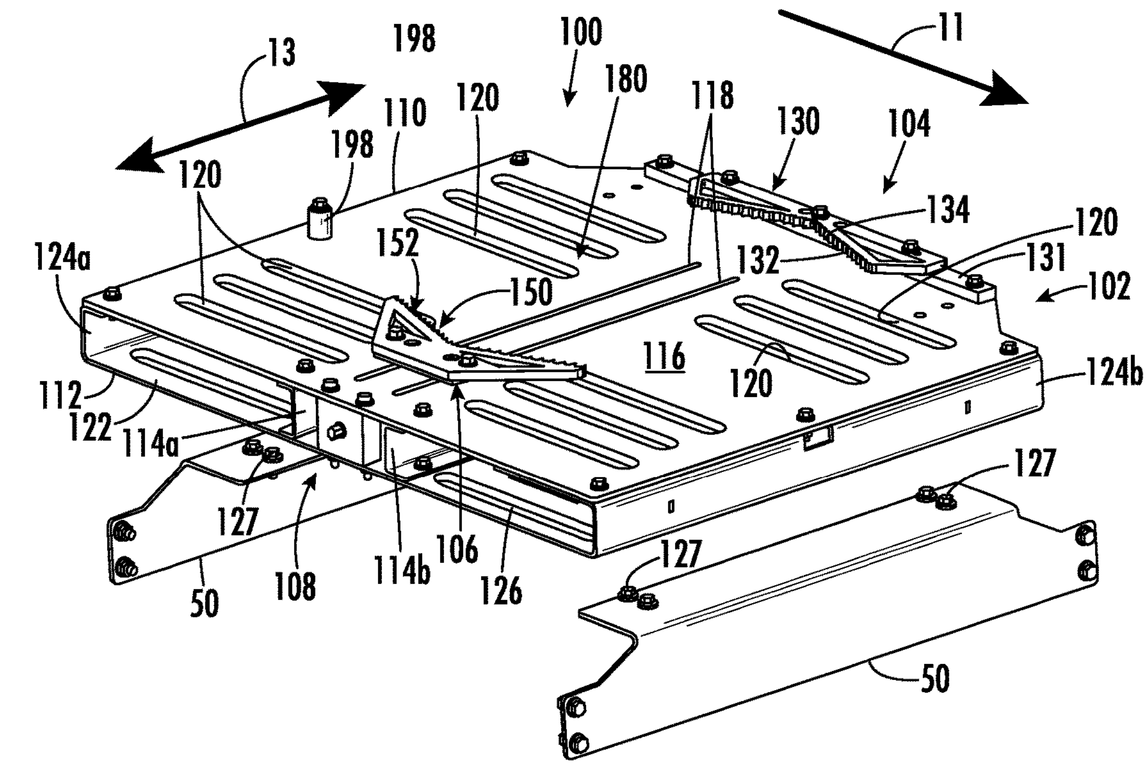
FIG. 2 shows a perspective view of first embodiment of a mounting apparatus according to a first embodiment which may be used in the system of FIG. 1.
Figure 7B:
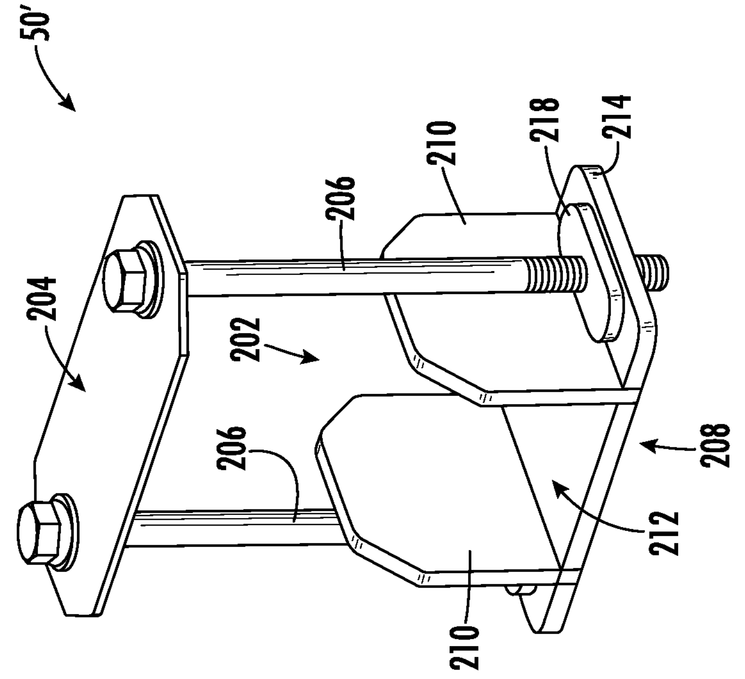
FIG. 7B shows a perspective view of the mounting bracket of FIG. 7A.
Figure 7A:
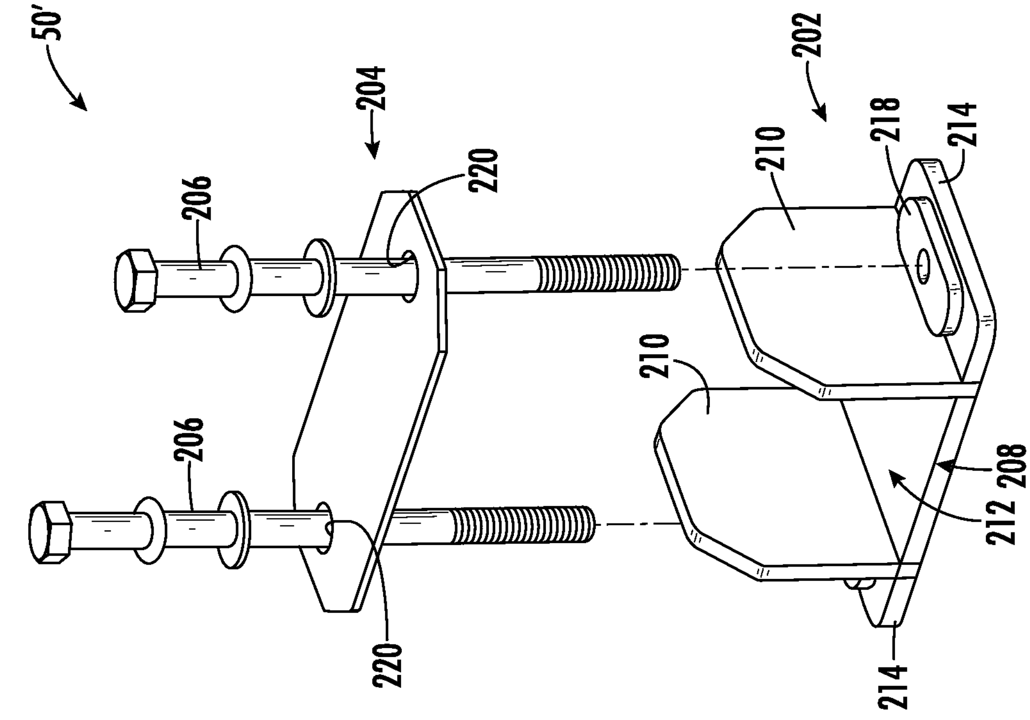
FIG. 7A shows a partially exploded perspective view of another embodiment of a mounting bracket that may be used in connection with the mounting apparatus of FIG. 2.

The mounting brackets 50 are brackets suitable to firmly attach to the log bed 24 and to the mounting apparatus 100. FIG. 2, discussed further below, shows an exemplary embodiment of mounting brackets 50. However, it will be appreciated that the portion of the mounting brackets 50 that attach to the log bed may be modified to accommodate various log bed/saw mill designs. FIGS. 7A and 7B, discussed further below, show another example of a suitable mounting bracket 50' that may be used. Referring to FIG. 2, the mounting bracket 50 are preferably removably securable to the log bed 24 such to allow the user to remove the mounting apparatus 100 to facilitate other types of cuts, for example, lengthwise board cuts of a log that is horizontally supported on the log bed 24, as is known in the art.

Figure 3:
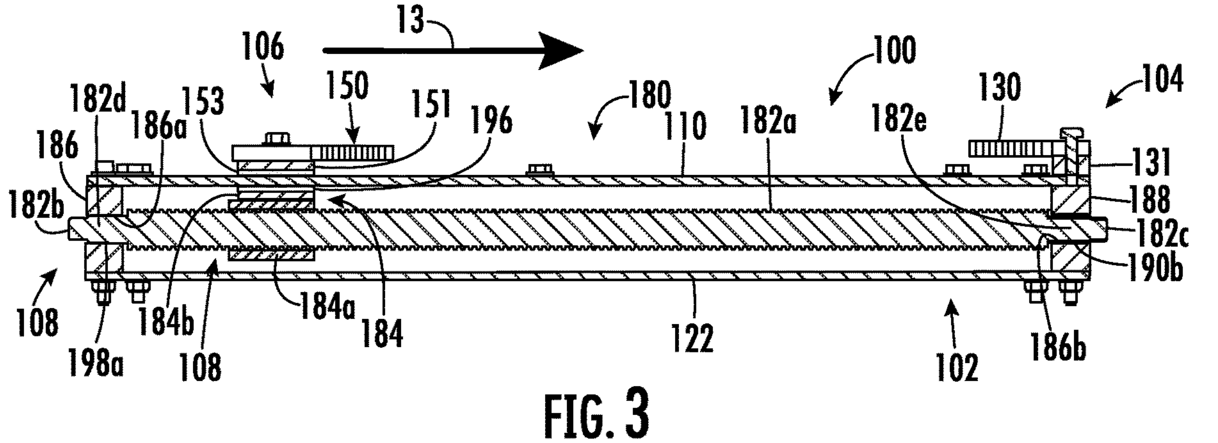
FIG. 3 shows a cutaway view of the mounting apparatus of FIG. 2.
Figure 4:
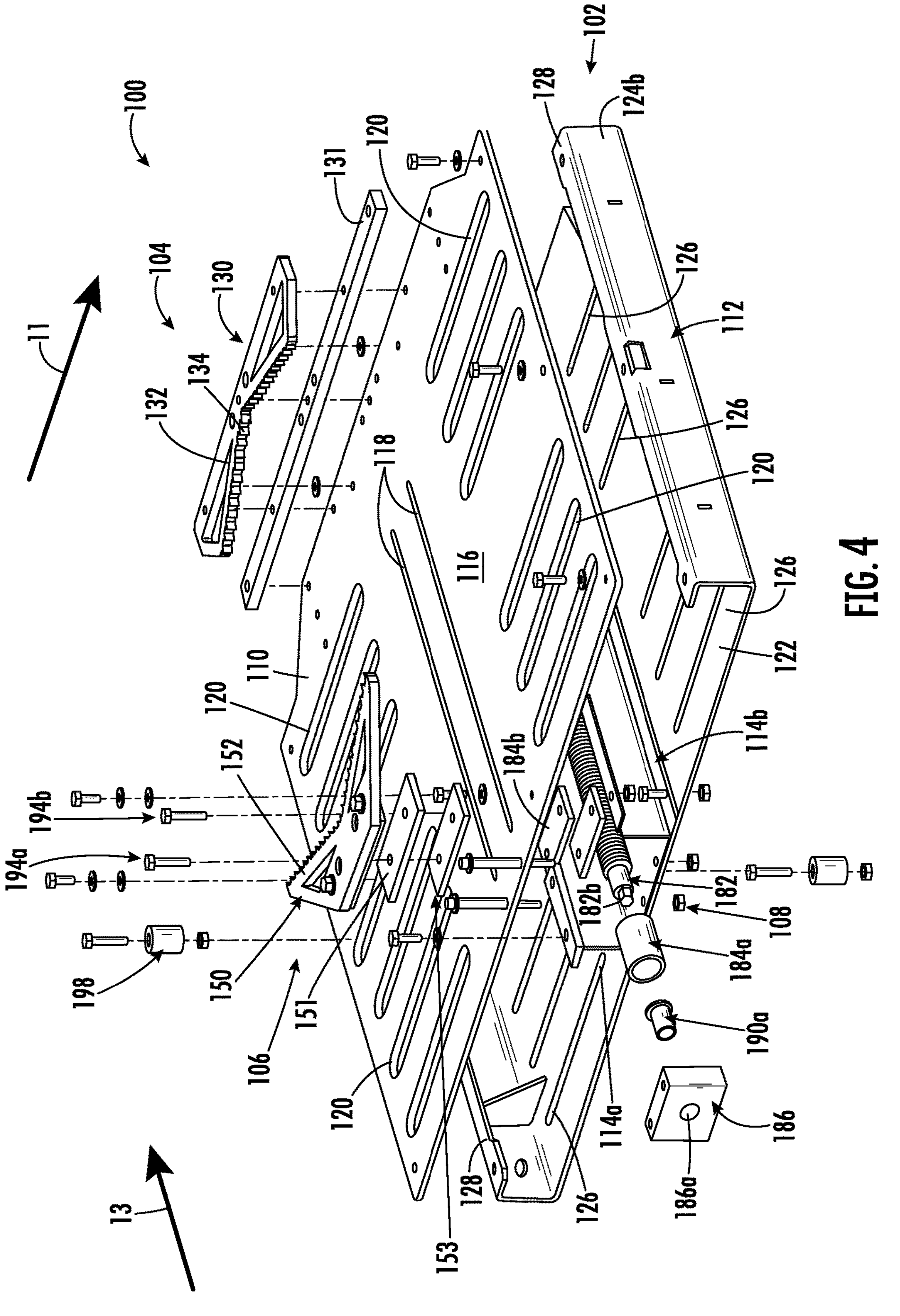
FIG. 4 shows an exploded view of the mounting apparatus of FIG. 2.

Further detail regarding a first exemplary embodiment of the mounting apparatus 100 is provided with reference to FIGS. 2, 3 and 4. FIG. 2 shows a perspective view of the mounting apparatus 100 and a first embodiment of mounting brackets 50. FIG. 3 shows a cross sectional view of the mounting apparatus taken along the centerline of the mounting apparatus 100 of FIG. 2. FIG. 4 shows an exploded view of the mounting apparatus 100 of FIG. 2. It will be appreciated that some of the fasteners of the apparatus 100 of FIG. 4 have been removed for clarity of exposition, but those of ordinary skill in the art would readily know of suitable fasteners to assemble the mounting apparatus 100.

With reference to FIGS. 2, 3 and 4, the mounting apparatus 100 includes a frame 102, a stationary jaw assembly 104, a movable jaw assembly 106, and a lead screw assembly 108. The stationary jaw assembly 104, the movable jaw assembly 106 and the lead screw assembly 108 are all supported by the frame 102. In FIGS. 2, and 4, the direction 11 indicates the cut direction, or in other words, the travel of the saw head 22 along the log bed 24 when the mounting apparatus 100 is mounted on the log bed 24 in the manner indicated in FIG. 1.

The frame 102 includes the first plate 110, a lower platform 112, and first and second spacer brackets 114. The first plate 110 in this embodiment includes a flat steel plate 116, which has two linear track slots 118 and a series of openings 120 defined therethrough. The linear track slots 118 are parallel slots that extend in a direction perpendicular to the cut direction 11. The linear track slots 118 define the travel path of the movable jaw 150. The direction of travel of the movable jaw 150 is referred to as the clamping direction 13. It will be appreciated that the clamping direction 13 need not be perpendicular to the cut direction 11, and may indeed be at none or any angle from the cut direction 11. However, for reasons that will become clearer below, the arrangement of the clamping direction 13 perpendicular to the cut direction 11 increases the accessibility for adjusting the movable jaw 150.

The series of openings 120 are spaced throughout the steel plate 116 and provide tool access therethrough, as will be discussed below. The openings 120 also help reduce the weight the first plate 110 and hence the mounting apparatus 100 overall.

The lower platform 112 of the frame includes a second plate 122 and integrally formed end walls **124*a*, 124*b*. The second plate 122 is a flat steel plate having a series of openings 126 defined therethrough. The second plate 122 may have substantially the same length and width as the first plate 110. Each of the end walls 124*a*, 124*b* extends upward at least approximately 2 cm, and in this embodiment approximately 6 cm, from opposite ends of the flat second plate 122. Each of the end walls 124*a*, 124*b* includes corresponding inward extending shelves 128*a*, 128*b* at their respective tops. The first plate 110 is supported on and secured to the shelves 128*a*, 128*b*** by suitable fasteners.

The openings 126 are sized and configured to receive shafts of suitable fasteners 127, for example, of the mounting brackets 50. (See FIG. 2). The openings 126 have a width that does not allow passage of the heads the fasteners 127, but does allow passage of the shafts of the fasteners 127. Accordingly, the openings 126 are configured to enable suitable fasteners 127 to secure the second plate 122 to, among other things, the mounting brackets 50. It will furthermore be appreciated that the openings 120 in the first plate 110 allow for access of a tool to tighten the fasteners 127. Accordingly, the openings 120 in the first plate 110 should be at least partially aligned with the openings 126. The openings 126 may suitably be wider than the openings 120 to allow passage of a tool for tightening or loosening of the fasteners 127 therethrough, if desired. The openings 120 and 126 are preferably configured as slots extending in the cut direction 11. Such a configuration allows for the mounting brackets 150 to attached to cross-bunks (or other features) of various log beds having different spacing therebetween.

The first and second spacer brackets **114*a*, 114*b* are suitable U-beams turned on their side. The brackets 114*a***,

114*b* in any event have a height corresponding to the height of the end walls 124*a*, 124*b*. The brackets 114*a*, 114*b* extend in the clamping direction 13 parallel to the end walls 124*a*, 124*b*, and are coupled at the top to the first plate 110, and at the bottom to the second plate 122. The brackets 114*a*, 114*b* are spaced apart and define a channel therebetween extending in the clamping direction 13. Thus, in this embodiment, the spacer brackets 114*a*, 114*b* cooperate with the end walls 124*a*, 124*b* to create a space between the first plate 110 and the second plate 122. The spacer brackets 114*a*, 114*b* furthermore add strength for supporting a log placed on the first plate 110.

It will be appreciated that in other embodiments, it would be possible to use a single top plate, so long as provision for connecting the top plate to the log bed 24 is provided.

The stationary jaw 130 and movable jaw 150 have respective gripping faces 132, 152 that face toward each other, defining a clamp interior 180 therebetween. In use, a log (e.g. the log 15 of FIG. 1) is clamped by the gripping faces 132, 152 in the clamp interior 180. When the mounting apparatus 100 is secured to the log bed 24 (see FIG. 1), the sawmill 20 may thereafter execute a cross cut on the log 15.

In further detail regarding the stationary jaw assembly 104, the stationary jaw assembly 104 includes the stationary jaw 130 and a clamp mount 131. The stationary jaw 130 is fixedly fastened indirectly to the first plate 110 via a clamp mount 131, which is in the form of a rectangular bar. The clamp mount 131 provides additional vertical relief of the stationary jaw 130 away from the first plate 110 to improve gripping power with respect to the log. In one embodiment, multiple spacers similar to the clamp mount 131 may be optionally added by the user when further vertical relief is desired or needed.

Figure 5:
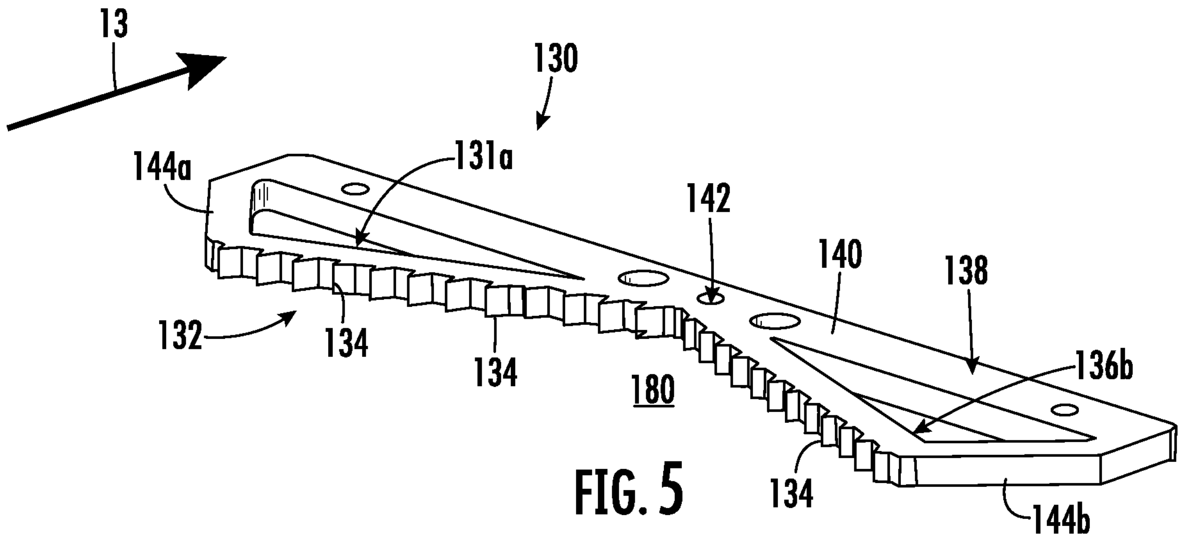
FIG. 5 shows an enlarged perspective view of a stationary jaw of the mounting apparatus of FIG. 2.

FIG. 5 shows an enlarged perspective view of the stationary jaw 130 apart from the mounting apparatus 100. The gripping face 132 of the stationary jaw 130 in has a concave shape relative to the clamp interior 180, and preferably has at least one tooth configured to at least partially penetrate in to the log. In this embodiment the stationary jaw 130 includes a plurality of teeth 134 extending inward toward the clamp interior 180 from the gripping face 132.

Structurally, the stationary jaw 130 in this embodiment includes clamp body 138 formed of steel and having a back bar 140, a first wing 136*a*, and a second wing 136*b*. The first wing 136*a* extends from a central point 142 at an angle with respect to the cut direction 13 generally toward the movable jaw 150, and the second wing 136*b* extends from the central point 142 at a complementary angle with respect to the cut direction generally toward the movable jaw 150, such that the wings 136*a*, 136*b* form a concave V-shape. At the central point 142, the wings 136*a*, 136*b* are positioned adjacent to the back bar 140. At their furthest extent, the wins 135*a*, 136*b* are spaced apart from the back bar 140 and are connected to the back bar 140 via respective end braces 144*a*, 144*b*

Returning again generally to FIGS. 3 and 4, the movable jaw assembly 106 includes the movable jaw 150, a sliding clamp mount 151, and wear resistant bearing plate 153. The movable jaw 150 is fixedly fastened to the sliding clamp mount 151. The sliding clamp mount 151 is a rectangular steel plate that is slidingly coupled to the first plate 110. As will be discussed further below, the sliding clamp mount 151 is operably coupled to be driven by the lead screw assembly 108. By this means, the distance between the movable jaw 150 and the stationary jaw 130 may be adjusted to suit the size of the log to be cross-cut.

The clamp bearing plate 153 is affixed to the sliding clamp mount 151 and is disposed between the sliding clamp mount 151 and the surface of the first plate 110. The clamp bearing plate 153 is formed of a strong polymer with good sliding and wear properties, such as ultra high molecular weight (UHMW) polyethylene. The clamp mount 151 and clamp bearing plate 153 provide additional vertical relief of the movable jaw 150 away from the first plate 110 to improve gripping power with respect to the log 15.

In this embodiment, both jaws 130, 150 are attached to their respective mounts 131, 151 such that they may be removed for servicing without removing either mount 131, 151.

Figure 6:
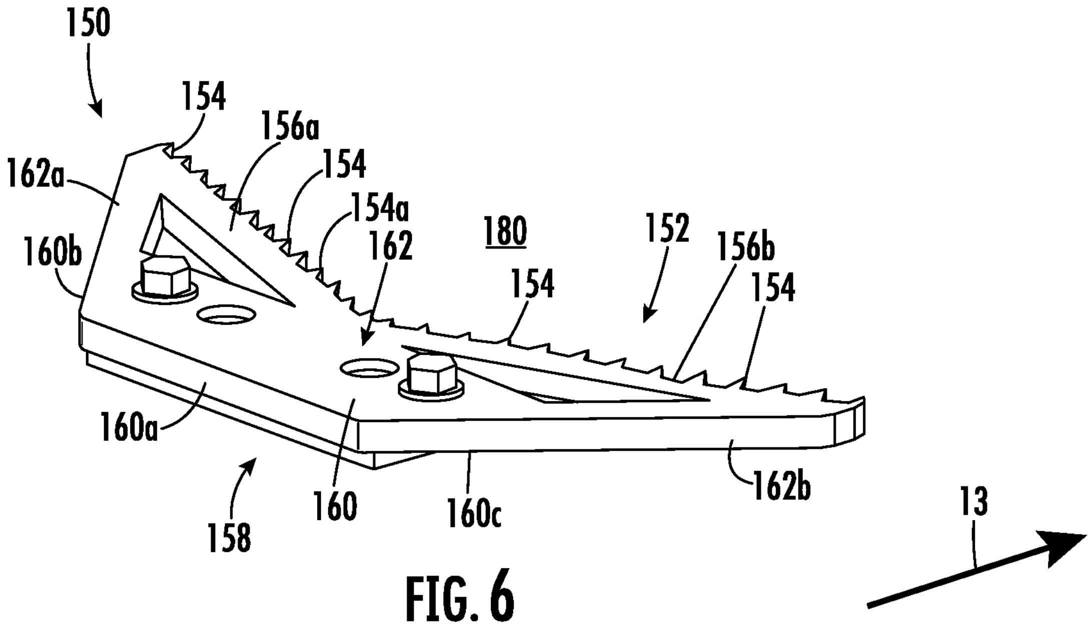
FIG. 6 shows an enlarged perspective view of a movable jaw of the mounting apparatus of FIG. 2.

FIG. 6 shows an enlarged perspective view of the movable jaw 150 apart from the mounting apparatus 100. The gripping face 152 of the movable jaw 150 in has a concave shape relative to the clamp interior 180, and preferably has at least one tooth configured to at least partially penetrate in to the log. In this embodiment the movable jaw 150 includes a plurality of teeth 154 extending inward toward the clamp interior 180 from the gripping face 152.

The movable jaw 150 itself may suitably be similar to the stationary jaw 130. The movable jaw 150 in this embodiment includes clamp body 158 formed of steel and having a back bar 160, a first wing 156*a*, and a second wing 156*b*. The back bar 160 has a trapezoidal shape with short end 160*a* forming the rear of the movable jaw 150, two outwardly angled sides 160*b* and 160*c*, and a long end that is not separate, but rather defines a dividing point between the back bar 160 and the wings 156*a*, 156*b*.

The first wing 156*a* extends from a central point 162 at an angle with respect to the cut direction 13 generally toward the stationary jaw 130, and the second wing 156*b* extends from the central point 162 at a complementary angle with respect to the cut direction 13, and generally toward the stationary jaw 130. As a result, the wings 156*a*, 156*b* form a concave V-shape. At the central point 162, the wings 156*a*, 156*b* are positioned near the back bar 160. At their respective opposite ends, the wings 156*a*, 156*b* are spaced apart further from the back bar 160 but are connected to and supported by the back bar 160 by respective brace bars 162*a*, 162*b*. The brace bars 162*a*, 162*b* extend as a continuation of the angled sides 160*b*, 160*c* of the back bar 160.

The V-shapes of the clamping faces 132, 152 provide the advantage of being able to engage logs of a plurality of diameters (via different sets of the plurality of teeth 134 on the stationary jaw 130 and different sets of teeth 154 on the movable jaw 150). The shapes of the clamping faces 132 and 152 also accommodate the fact that logs are not perfectly round. The V-shapes of the clamp faces 132, 152 can place at least four points of contact on a wide variety of log shapes and sizes. It will be appreciated that other shapes or configurations of the clamping faces 132, 152 not strictly having a V-shape can place multiple contact points on a variety of log shapes and sizes.

Referring again generally to FIGS. 2, 3 and 4, the lead screw assembly 108 is configured to provide for controlled movement of the movable jaw 150 towards the stationary jaw 130, in order to perform clamping therebetween. To this end, the lead screw assembly 108 includes a lead screw 182, a carrier 184, a first terminal block 186, a second terminal block 188, and bushings 190*a*, 190*b*. The bushings 190*a*, 190*b* are preferably low friction bushings such as oil impregnated bronze or plastic.

The lead screw 182 in this embodiment includes a threaded shaft 182*a*, opposing drive ends 182*b*, 182*c*, and opposing shanks 182*d*, 182*e* disposed between the threaded shaft 182*a* and respective drive ends 182*b*, 182*c*. The lead screw 182 is rotatably mounted on the first and second terminal blocks 186, 188, and extends therebetween in the clamp direction 13 under the first plate 110. At least the drive end 182*b* (see FIG. 4), and preferably both drive ends 182*b*, 182*c*, are configured to receive a standard drive tool. To this end, the drive ends 182*b*, 182*c* may be hexagonal bits.

The first terminal block 186 has an opening 186*a* configured to rotatably receive the shank 182*d* via the first bushing 190*a*, and the second terminal block 188 has an opening 188*a* configured to rotatably receive the shank 182*e* via the second bushing 190*b*. The first terminal block 186 is mounted to and between the first plate 110 and the second plate 122 at a position closer to the movable jaw 150 than the stationary jaw 130, and outside the outermost extent of travel of the movable jaw 150. The second terminal block 188 is mounted to and between the first plate 110 and the second plate 122 at a position spaced apart from the first terminal block 186, and preferably is located beyond the innermost extent of travel of the movable jaw 150. In this embodiment, the terminal blocks 186, 188 are disposed at opposite side edges of the first plate 110.

The carrier 184 includes a lead screw nut 184*a* mounted to a travel plate 184*b*, for example, by a weldment. The nut 184*a* has internal threads complementary to those of the threaded shaft 182*a*, and as a consequence, rotation of the lead screw 182, for example, by the drive end 182*a*, causes linear movement of the lead screw nut 184 in the clamping (or opposite) direction 13. The travel plate 184*b* is coupled via fasteners 194*a*, 194*b* to the sliding clamp mount 151. The fasteners 194*a*, 194*b* pass through the linear track slots 118, and thus may move freely back and forth in the clamping direction 13. A travel plate bearing 196 is affixed to the travel plate 184*b* and is disposed between the travel plate 184*b* and the under surface of the first plate 110. The travel plate bearing 196 is formed of a strong polymer with good sliding and wear properties, such as ultra high molecular weight (UHMW) polyethylene.

In operation, the mounting apparatus 100 is first mounted to a sawmill, such as the sawmill 20 of FIG. 1. To this end, the clamping brackets 50 in this embodiment are bolted to cross-bunks 30 of the sawmill 20. The second plate 122 is then secured to the mounting brackets 50 via the fasteners 127 that are inserted through the slotted openings 126 of the second plate 122 and into corresponding openings in the mounting bracket 50. A fastening tool, not shown, may access the fasteners 127 via the openings 120 in the first plate 110. As discussed above, the spacing between the brackets 50 may vary for different saw mill configurations. However, the slotted configuration of the openings 120, 126 in the respective first and second plates 110, 122, allow for attachment of the mounting apparatus 100 over a wide range of such spacing, so as to accommodate different saw mills. Moreover, the multitude of slot openings 120, 126 in the direction 13 allow the apparatus 100 to be attached to the log deck at various lateral positions, so as to avoid interfering with other log bed attachments, not shown, but which can include clamps, log rests, hydraulic toeboards, for example.

Once the mounting apparatus 100 is mounted on the log bed 24, the log 15 may be placed in an upright position on the first plate 110 between the movable jaw 150 and the stationary jaw 130. The log 15 may be moved to a position where it contacts the stationary jaw 130. The operator may then use a suitable tool to engage the drive end 182*b* to rotate the lead screw 182. Rotation of the screw 182 causes the carriage 184 to move in the clamping direction 13. Movement of the carriage 184 causes the sliding mounting plate 151 to move in the clamping direction 13 as well. During this movement, the fasteners 194*a*, 194*b* move along the slots 118 in the first plate 110. The operator continues rotating the lead screw 182 until the movable jaw 150 clamps the log 15 firmly against the stationary jaw 130.

It will be appreciated that the width of the slots 118 preferably allow for slight play or rotation of the movable jaw 150 about a vertical axis. To achieve this play, the fasteners 194*a*, 194*b* are preferably slightly loosened. The play or slight rotation of the jaw 150 helps accommodate gripping logs that are not circular.

Once clamped, the operator can use the up/down crank system 32 to adjust the height of the saw head 22 (which includes a blade, not shown separately) and thus the height of the cut. It will be appreciated that the height should be at least sufficient to avoid contact between the blade and the mounting apparatus 100. To this end, in this embodiment, the mounting apparatus 100 include minimum cut height indicator 198 disposed on the first plate 110. The minimum height cut indicator 198 is a plastic knob that is only slightly taller than the height of all steel parts on the mounting apparatus 100. Because the height from the first plate 110 is not tied to the height scale on the sawmill 20 itself, it may not be obvious to the operator how low the saw blade may be set on the final set of cuts. If the blade of the sawmill 20 makes contact the indicator 198, then that signals to the operator that the cut is too low. If the operator progressed into the cut after that point, the blade could engage steel fasteners, thereby causing damage.

In any event, after the vertical position of the saw head 22 is set, the operator may then start the sawmill engine or motor, and move the working saw head 22 along the cut direction 11 to cross cut the log 15.

The operator may then retract the saw head 22 back away from the log 15, adjust the saw head 22 downward by a desired amount, and perform an additional cross-cut of a another cookie. This process may be repeated until the log 15 can no longer be cross-cut. Once the cross-cutting of the log 15 is completed, the operator may loosen the clamping force by reverse rotation of the lead screw 182. As discussed above, if the operator desires to perform lengthwise cuts on horizontally disposed logs, the mounting apparatus 100 and mounting brackets 50 may be decoupled from and removed from the log bed 24.

It will be appreciated that the above-described embodiments are merely illustrative, and that those of ordinary skill in the art may readily devise their own implementations and modifications that incorporate the principles of the present invention and fall within the spirit and scope thereof.

By way of example, it will be appreciated that the orientation of the two (or more) jaws 130, 150 may be placed anywhere on the main platform. It is not necessary for the jaws to be aligned parallel to the direction of the sawmill blade travel. The apparatus could be installed on a portable sawmill bed so that the clamping direction of the jaws was normal to the sawblade. Additional jaws or alternate clamping methods could be used in any orientation to increase stability of the log.

In another example, as mentioned above, different mounting brackets may be used. For example, FIGS. 7A and 7B show another example of a mounting bracket assembly 50' that may be used in lieu of the mounting brackets 50. In particular, FIG. 7A shows a partially exploded perspective view of the mounting bracket assembly 50' and FIG. 7B shows a perspective view of the mounting bracket assembly 50'. In general, the mounting bracket assembly 50' include a bunk engaging bracket 202, a top plate 204, and a plurality of fasteners 206. The bunk engaging bracket 202 includes a bottom plate 208 and first and second upright plates 210. The upright plates 210 extend upward form the bottom plate 208 and are spaced apart by a distance to define a seat 212. The bottom plate 208 defines two shelves 214 that extend outward from the seat 212. The shelves 214 include threaded holes 216 and a spacer 218.

The upright plates 210 are spaced such that the seat 212 is adapted to relatively tightly receive the bottom of a bunk of a sawmill, such as any of the bunks 30 of FIG. 1. The top plate 204 is configured to be engaged above the second plate 122 of the mounting assembly 100 (see FIGS. 2 to 4). The top plate 204 includes openings 220 for receiving the fasteners 206 therethrough.

With reference to FIGS. 1, 2, 7A and 7B, to mount the mounting apparatus 100 to a sawmill such as the sawmill 20, the bunk engaging bracket 202 is disposed such that the bottom of a suitable bunk 30 of the sawmill 20 is disposed in the seat 212. The bunk 30 preferably relatively tightly engages the top of the bottom plate 208, as well as the upright plates 210. The top plate 204 disposed on and above the second plate 122 of the mounting apparatus 100 in alignment with suitable openings 126 of the second plate 122. The mounting apparatus 100 and/or the top plate 204 is manipulated such that the openings 220 in the top plate 204 of the mounting bracket assembly 50' align with the threaded holes 216 in the shelves 214 of the mounting bracket assembly 50'. The threaded fasteners 206 are extended through the openings 220 and the openings 126 of the second plate 122, and are then rotatably engaged with the threaded holes 216 to secure the bunk 30 between top plate 204 (and second plate 122) and the bottom plate 208. It is desirable to use at least one and preferably at least two mounting bracket assemblies 50' on each of two different bunks 30 to secure the mounting apparatus 100 to the log bed 24 of the sawmill 20.

The invention claimed is:

1. An apparatus for mounting logs for processing on a sawmill having a log bed defining a log bed plane, comprising:

a first plate mountable on a log bed of a sawmill;

a first jaw supported on the plate;

at least one movable jaw supported on the plate, the movable jaw configured to move at least in part in a direction parallel to the log bed plane when the first plate is mounted on the log bed, wherein the movable jaw and the first jaw are collectively configured to fixedly clamp a log in a clamp interior such that a grain direction of the log is normal to the log bed plane;

at least one lead screw operably coupled to cause movement of the at least one movable jaw in the direction parallel to the log bed plane; and a second plate coupled to the first plate, wherein the lead screw is disposed between the second plate and the first plate.

2. The apparatus of claim 1, wherein each of the first jaw and the movable jaw has a concave shape relative to the clamp interior, and each of the first jaw and movable jaw has at least one tooth configured to at least partially penetrate in to the log.

3. The apparatus of claim 2, wherein the movable jaw includes a plurality of teeth extending inward toward the clamp interior from a clamp body surface.

4. The apparatus of claim 3 wherein the clamp body surface includes a first wing and a second wing extending away from each other and at least partly inward toward the clamp interior.

5. The apparatus of claim 4, wherein the first wing and the second wing are configured such that logs of a plurality of diameters engage different sets of the plurality of teeth on the first wing and different sets of the plurality of teeth on the second wing.

6. The apparatus of claim 1, wherein the lead screw is rotatably coupled to the first plate by a plurality of spaced apart hubs.

7. The apparatus of claim 1, wherein the first jaw is a stationary jaw.

* * * * *